Figure 1:
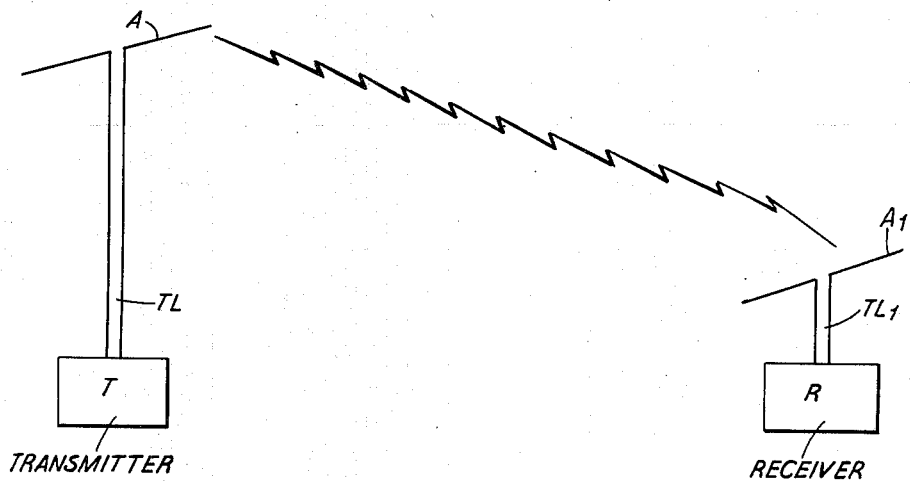

Aug. 23, 1938.   H. O. PETERSON   2,127,572
ULTRA-HIGH-FREQUENCY COMMUNICATION SYSTEM
Filed July 13, 1935

INVENTOR
H.O. PETERSON
BY
ATTORNEY

Patented Aug. 23, 1938

2,127,572

UNITED STATES PATENT OFFICE 2,127,572

ULTRA-HIGH-FREQUENCY COMMUNICATION SYSTEM

Harold Olaf Peterson, Riverhead, N. Y., assignor to Radio Corporation of America, a corporation of Delaware Application July 13, 1935, Serial No. 31,183

4 Claims. (Cl. 250—15)

This invention relates to communication systems, and particularly to ultra high frequency relaying systems wherein there is provided a transmitting station and one or more remote repeating stations.

An object is to provide an ultra short wave system which excludes a high percentage interference such as may be due to static from thunder storms, sparking from the ignition systems of airplanes, etc.

Another object of the present invention is to provide an economical communication system of high efficiency.

It has heretofore been customary in ultra high frequency communication systems employing waves of quasi-optical nature to equip the transmitting and receiving systems with antennae elevated as high as possible with respect to the earth in order to obtain at the receiver as much of the transmitted energy as possible.

It is generally accepted theory that for a given condition at a receiving station the field strength of the received signals increases in proportion to the height of the antenna at the transmitting station, and that for a given condition at the transmitting station the field strength of the received signal increases in proportion to the height of the receiving antenna.

I have found that as the height of the receiving antenna is increased the strength of the received undesired interfering noises also increases and consequently the signal-to-noise ratio remains approximately constant as the receiving antenna is elevated. It is assumed, of course, that the receiving antenna is sufficiently elevated to be up in the direct line of sight between transmitter and receiving stations, and that the interfering noise is engendered from sources uniformly distributed at various distances and directions around the receiving stations.

It is proposed in accordance with the invention to provide an economical and efficient communication system by placing the receiving antenna at a moderate height above ground and making it highly directive, while in the preferred arrangement elevating the transmitting antenna as high as possible and making it moderately directive. Since a good directive antenna requires a considerable amount of space and must be adequately supported it will also be appreciated that such an antenna is more economical to construct at a lower height above ground than one at a higher level. Furthermore, so long as the signal-to-noise ratio is substantially constant at various elevations above ground, it will also be appreciated that it is most economical and efficient to locate the receiving antenna at a moderate height above ground and make it highly directive.

Inasmuch as two of the prevalent sources of interference encountered in radio relaying systems are ignition from airplanes and static from local thunder storms, and these are generally uniformly distributed in all directions around the receiving antenna, it is thus possible by means of the present invention to exclude a high percentage of such disturbances by making the receiving antenna highly directive in the horizontal plane.

Although it is preferred that the transmitting antenna be directive, it is not necessary that it have very high directivity for which reason a relatively simple transmitting antenna can be used which can be mounted at the top of a high tower. For the incoming signal it is important that the receiving antenna be able to discriminate against interferences arriving from directions other than that to the transmitter and consequently the receiving antenna is made to have high directivity.

Figure 2:
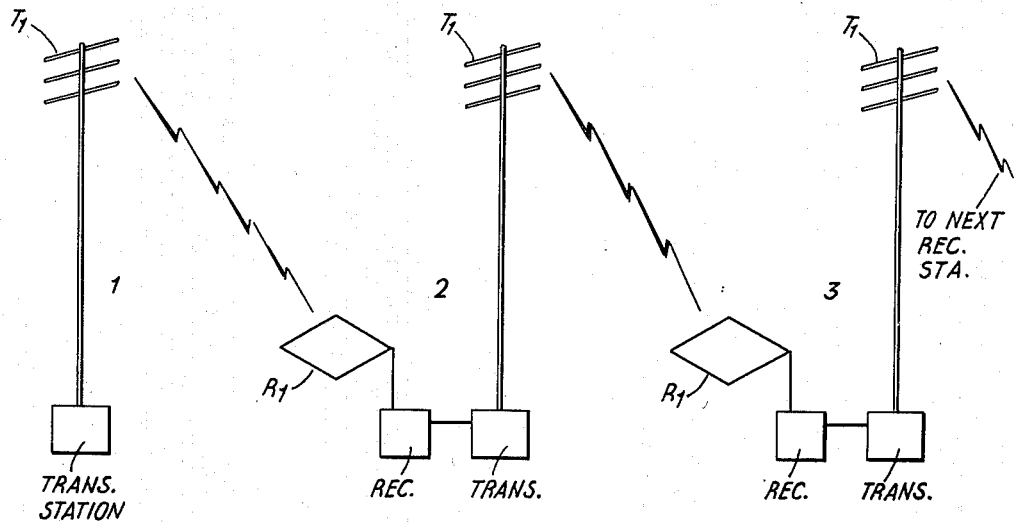

In the drawing, Figs. 1 and 2 illustrate by way of example only, two communication circuit arrangements, embodying the principles of the present invention.

Fig. 1 discloses a simple ultra short wave communication system comprising a transmitting station T and a receiving station R separated from one another by a distance preferably within the direct line of sight between their associated antennae. Station T is shown provided with a directive dipole antenna A which is elevated as high as possible with respect to ground, preferably on top of a high tower, not shown, and connected to the transmitter over a transmission line TL. Receiving station R is also provided with a directive dipole antenna A1 which is located relatively close to the ground and connected to the receiver by line TL1.

Fig. 2 is an ultra short wave relaying system showing a transmitting originating station 1 and two relaying stations 2 and 3. At each station is a highly elevated simple transmitting antenna T1 for transmitting the signals to the next adjacent receiving system. At each relay station 2 and 3 is a highly directive receiving antenna R1 placed in the horizontal plane for receiving the signals from the adjacent transmitting station. These receiving antennas are herein shown as of the diamond type, although any other highly directive type can be employed. There is also provided at each relaying station a highly elevated transmitting antenna T1 similar to that at the station 1. Antennas T₁ are herein shown as employing a plurality of horizontal dipoles, merely for the purpose of illustration.

From the foregoing, it will be evident that various changes can be made in the circuit arrangements shown without departing from the spirit and scope of the invention.

What is claimed is:—

1. A short wave radio relaying system for the relaying of ultra-high frequency, quasi-optical waves, comprising a transmitting station and a remote relaying station in the direct line of sight of said transmitting station, said stations each having a transmitting antenna in the horizontal plane highly elevated with respect to ground and directed toward the next adjacent receiving station in the direction of transmission, said relaying station having a highly directive receiving antenna in the horizontal plane arranged to receive the signals from said transmitting station, said receiving antenna being located relatively close to the ground.

2. In a radio relaying system for relaying ultra-high frequency, quasi-optical waves, a relay station having both a transmitting antenna and a receiving antenna, said transmitting antenna being highly elevated with respect to ground and said receiving antenna being much less elevated with respect to ground.

3. In a radio relaying system for relaying ultra-high frequency, quasi-optical waves, a relay station having a transmitting antenna of moderate directivity highly elevated with respect to ground and a receiving antenna of high directivity mounted relatively close to ground.

4. In a radio relaying system for relaying ultra-high frequency, quasi-optical waves, a relay station having a transmitting dipole highly elevated with respect to ground, and a receiving antenna of high directivity in the form of a diamond positioned in the horizontal plane and mounted relatively close to the ground.

HAROLD OLAF PETERSON.